(12) United States Patent
Liou

(10) Patent No.: US 10,041,465 B2
(45) Date of Patent: Aug. 7, 2018

(54) WATER WHEEL DEVICE AND CONTROL MECHANISM THEREFOR

(71) Applicant: David Liou, New Taipei (TW)

(72) Inventor: David Liou, New Taipei (TW)

(73) Assignee: Cheng-Tsun Liu, Taipei (TW)

( * ) Notice: Subject to any disclaimer, the term of this patent is extended or adjusted under 35 U.S.C. 154(b) by 229 days.

(21) Appl. No.: 14/909,490

(22) PCT Filed: Aug. 2, 2013

(86) PCT No.: PCT/CN2013/080723
§ 371 (c)(1),
(2) Date: Feb. 2, 2016

(87) PCT Pub. No.: WO2015/013980
PCT Pub. Date: Feb. 5, 2015

(65) Prior Publication Data
US 2016/0195059 A1 Jul. 7, 2016

(51) Int. Cl.
*F03B 3/14* (2006.01)
*F03B 7/00* (2006.01)
(Continued)

(52) U.S. Cl.
CPC .............. *F03B 3/145* (2013.01); *F03B 3/121* (2013.01); *F03B 7/00* (2013.01); *F03B 17/065* (2013.01); *Y02E 10/223* (2013.01); *Y02E 10/28* (2013.01)

(58) Field of Classification Search
CPC .... F03B 3/00; F03B 3/121; F03B 3/14; F03B 3/145; F03B 7/00; F03B 15/02;
(Continued)

(56) References Cited

U.S. PATENT DOCUMENTS 382,887 A * 5/1888 Lefort ..................... B64C 27/54
416/112
7,429,803 B2 9/2008 Davis
(Continued)

FOREIGN PATENT DOCUMENTS

CN          200999692 Y     1/2008
CN          101149040 A     3/2008
(Continued)

*Primary Examiner* — Woody Lee, Jr.
*Assistant Examiner* — Sang K Kim
(74) *Attorney, Agent, or Firm* — Bever, Hoffman & Harms, LLP

(57) ABSTRACT

A water turbine device is disclosed. The water turbine device includes a water shaft, a plurality of blade frames, a plurality of turbine blades, a pivot shaft and a blade control mechanism. The water shaft has a first axis. The plurality of blade frames are radially distributed around the water shaft. The plurality of turbine blades are mounted on the plurality of blade frames respectively. The pivot shaft is disposed on a corresponding one of the plurality of blade frames, has a second axis, and allows one of the plurality of turbine blades corresponding to the corresponding blade frame to be pivotally mounted on the corresponding blade frame. The blade control mechanism is disposed on an end opposite to the pivot shaft on the corresponding blade frame, wherein the turbine blade mounted on the corresponding blade frame has a stopper adjacent to the blade control mechanism.

15 Claims, 11 Drawing Sheets

(51) Int. Cl.
*F03B 17/06* (2006.01)
*F03B 3/12* (2006.01)

(58) Field of Classification Search
CPC ...... F03B 15/04; F03B 17/005; F03B 17/065; Y02E 10/223; Y02E 10/28
See application file for complete search history.

(56) References Cited

U.S. PATENT DOCUMENTS

| | | | | |
|---|---|---|---|---|
| 8,943,824 | B2* | 2/2015 | Isik | F03B 17/065 290/54 |
| 2008/0050219 | A1* | 2/2008 | Liou | F03B 7/00 415/141 |

FOREIGN PATENT DOCUMENTS

| | | | |
|---|---|---|---|
| CN | 101566125 A | 10/2009 | |
| CN | 201546888 U | 8/2010 | |

* cited by examiner

WATER WHEEL DEVICE AND CONTROL MECHANISM THEREFOR

FIELD OF THE INVENTION

The present invention is related to a water wheel, and more particularly to a control system for controlling the operation of a turbine.

BACKGROUND OF THE INVENTION

If a present turbine device encounters excessive flow or too rapid a flow rate, most of the water flow is controlled by opening or closing a sluice, but the drawback is that once the open breadth of sluice is changed, the flow rate and flow of water are simultaneously changed, and this will affect the flow of water downstream of the turbine. Furthermore, when the flow rate and flow of water are reduced at the same time, it will cause silt in water channel to become more serious, and therefore controlling the sluice is not a very good method. In addition, blade control is controlled via an electric way in some of the known art, and the advantage is that the blade can be turned on or off accurately and the open breadth can be controlled. However, the drawback is that if a power failure occurs, the electrically controlled blade will not work. Furthermore, because the turbine device is set in the water channel and the related means is also near the water channel, mist can be quite plentiful. It is known to those skilled in the art that mist can easily erodes electrical apparatus, and as a result, the electrical apparatus will break more easily and thus the maintenance cost increase. Moreover, turbine devices are usually located in remote areas and the traffic conditions are worse, and thereby the traffic component of maintenance further increases the cost. Therefore, a blade control system that can operate without electrical power in the field of turbine devices is urgently required.

In order to overcome the drawbacks in the prior art, a water wheel device and control mechanism therefor are disclosed. The particular design in the present invention not only solves the problems described above, but is also easy to implement. Thus, the present invention has utility for industry.

SUMMARY OF THE INVENTION

The purpose of the present invention is to reduce the dependence on the power turbine device. The contact and push of the mechanical structure are utilized to cause the control mechanism of the turbine blade to release the abutment condition to allow the blade to swing freely, or to restore the abutment condition to restrain the blade.

In accordance with one aspect of the present invention, a water turbine device is disclosed. The turbine device includes a water shaft having a first axis; a plurality of blade frames radially distributed around the water shaft; a plurality of turbine blades mounted on the plurality of blade frames respectively; a pivot shaft disposed on a corresponding one of the plurality of blade frames, having a second axis, and allowing one of the plurality of turbine blades corresponding to the corresponding blade frame to be pivotally mounted on the corresponding blade frame; a blade control mechanism disposed on an end opposite to the pivot shaft on the corresponding blade frame, wherein the turbine blade mounted on the corresponding blade frame has a stopper adjacent to the blade control mechanism.

In accordance with another aspect of the present invention, a control mechanism for controlling a water turbine device is disclosed. The water turbine device includes a water shaft, a plurality of blade frames radially distributed on the water shaft, a plurality of turbine blades mounted around the plurality of blade frames respectively, and a pivot shaft disposed on a corresponding one of the plurality of blade frames to allow one of the plurality of turbine blades corresponding to the corresponding blade frame to be pivotally mounted on the corresponding blade frame, wherein the control mechanism includes a stopper disposed on the turbine blade mounted on the corresponding blade frame and mounted thereon the pivot shaft; and a control element, wherein under a first condition, the control element abuts against the stopper to restrain a pivot turn of the turbine blade, and under a second condition, the control element releases an abutment with the stopper to allow the turbine blade to pivot relative to the corresponding blade frame.

The objectives and advantages of the present invention will become more readily apparent to those ordinarily skilled in the art after reviewing the following detailed descriptions and accompanying drawings, in which:

DETAILED DESCRIPTION OF THE PREFERRED EMBODIMENTS

The present invention will now be described more specifically with reference to the following embodiments. It is to be noted that the following descriptions of preferred embodiments of this invention are presented herein for the purposes of illustration and description only; they are not intended to be exhaustive or to be limited to the precise form disclosed.

Figure 1:
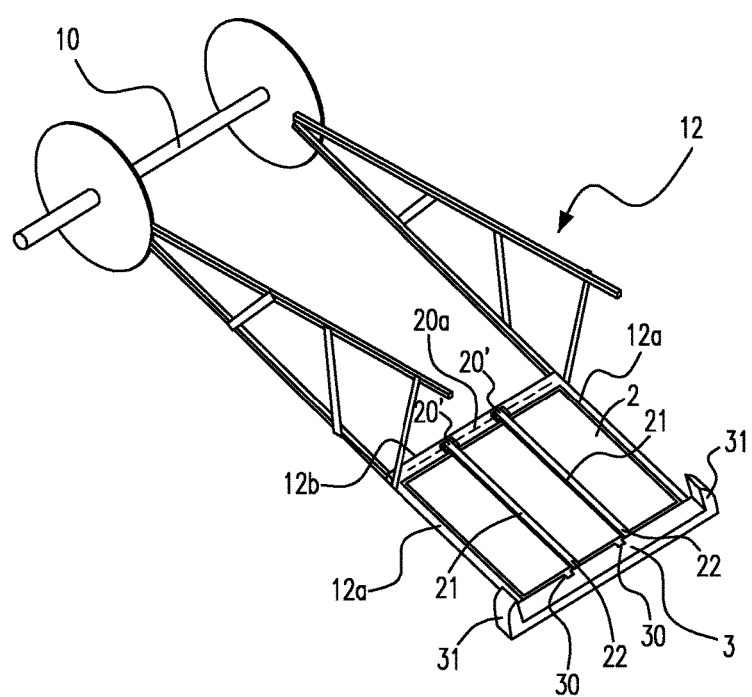
FIG. 1 shows a diagram of a single blade according to a preferred embodiment of the present invention.

Refer to FIG. 1, which is a schematic diagram of a water turbine with single blade of an embodiment according to the present invention. In order to more clearly show the relationship between the control system and the turbine, FIG. 1 merely shows a single-blade frame 12, while a blade holder 12 can be equipped with, but is not limited to, a blade 2. Blade frame 12 is fixed on a water shaft 10, which is a turbine shaft, and in fact the water turbine may include a plurality of blade frames 12 radially distributed around the water shaft 10. Blade frame 12 is composed of radial arms 12a and a crossbar 12b. A pivoting portion 20' is pivotally disposed on the cross bar 12b, i.e., the blade 2 is rotatably disposed in the blade frame 12 through the pivoting portion 20'. A stopper 22 is disposed on the pivoting portion 20 on the opposite side of the pivoting portion 20', and a stopper mechanism 3, used as a control mechanism for controlling the blade 2 to be stuck and fixed, is disposed on the blade frame 12 at a location adjacent to the stopper 22. In order to facilitate the arrangement between the blade 2 and the combination of the stopper 22 and the pivoting portion 20', usually both ends of a connecting arm 21 are utilized, and one is connected to the pivoting portion 20' while the other one is used as the stopper, and therefore the blade 2 is fixed on the connecting arm 21. Furthermore, the pivoting portion 20' is located at a blade axial direction 20a parallel to the turbine shaft 10. The stopper mechanism 3 has a gap 30 for the stopper 22 to pass through. In FIG. 1, the gap 30 and the stopper 22 are staggered so that the stopper mechanism 3 stops the stopper 22, and therefore prevents the blade 2 from rotating upward. It can be understood that the stopper mechanism 3 can be used as a controller by changing the position of the stopper mechanism 3 so as to determine neither the blade 2 can swing freely or is stopped, while the blade 2 is an active rather than a permanently fixed blade. When the stop mechanism 3 moves and allows the gap 30 to align with the stopper 22, the stopper 22 can pass through the gap 30, which renders the blade 2 rotatable. Both ends of the stopper mechanism 3 each have a push portion 31. When the push portion 31 at one end of the stopper mechanism 3 is pushed, the stopper mechanism 3 moves toward the other end. Also shown in FIG. 1, when the push portion 31 at the left end is pushed, the gap 30 will align with the stopper portion 22, as previously described. As disclosed in FIG. 1, the gap 30 staggers the stopper 22, which can be due to force on the push unit 31 at the right end. The blade 2 on the blade frame 12, pivot part 20', the blade frame 12 and the stopper mechanism 3 together constitute a set of turbine blades arranged to form a circle and the turbine shaft 10 is located at the center of the circle (referring to FIG. 9).

Figure 2:
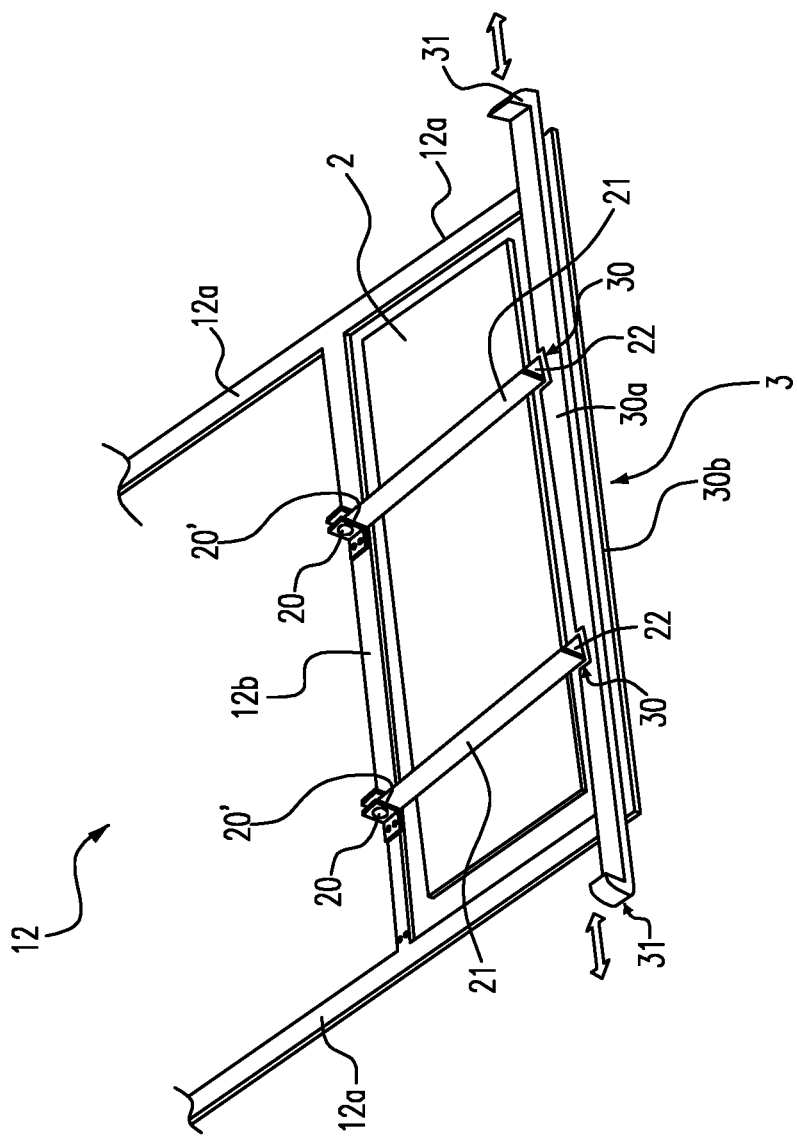
FIG. 2 shows a diagram of a blade and a stopper mechanism according to a preferred embodiment of the present invention.

Please refer to FIG. 2, which a schematic diagram showing the blade and stopper mechanism according to an embodiment of the present invention, and disclosing the back side of the blade 2, i.e. the side facing away from the flow direction. The blade 2 is disposed in the blade frame 12, wherein the blade frame 12 is composed of radial arms 12a and a crossbar 12b. A pivoting portion 20' is pivotally disposed on the cross bar 12b, i.e., the blade 2 is rotatably disposed in the blade frame 12 through the pivoting portion 20'. The radial arms 12a radially extend out from the turbine shaft 10 (referring to FIG. 1), while the crossbar 12b connects the two radial arms 12a at both ends. In order to facilitate the setting of the blade 2, the blade 2 is pivotally connected to the crossbar 12b via a connecting arm 21. Furthermore, the axial direction of the blade pivot shaft 20 (see FIG. 1 for the blade axial direction 20a) and the turbine shaft 10 (see FIG. 1) are parallel, and the other end of the connecting arm 21 protrudes from the edge of the blade 2 and acts as a stopper 22 to stop the stopper mechanism 3 and generate the stopping effect. In this regard, the stopper 22 on the connecting portion 21 is a free end of the connecting arm 21, while the other end is pivotally connected to the pivoting portion 20'. Generally speaking, the blade 2 and the connecting arm 21 together form a blade assembly, wherein the stopper 22 is located at the free end of the blade 2, and the pivot portion 20' is pivotally connected to the pivoting end of the blade 2. The stop mechanism 3 has a gap 30 disposed correspondingly on the stopper portion 22. As far as the position of the gap 30 of FIG. 2 is concerned, this is located in a position corresponding to the stopper portion 22, i.e., allowing the stopper portion 22 to pass through the gap 30 without being blocked by the stopper mechanism 3. Therefore, one can imagine that if the water flow is coining from below, since the stopper 22 will not be blocked by the stopper mechanism 3, the blade 2 will be able to swing upwards as the stopper 22 passes through the gap 30.

The stopper mechanism 3 further comprises a sliding portion 30a and a stationary portion 30b. The stationary portion 30b is fixed on the radial arm 12a of blade 12 (Referring to FIGS. 4 and 6), the slide portion 30a is disposed on the stationary portion 30b, and thus the stationary section 30b can strengthen the structural strength of the stopper mechanism 3. The gap 30 is disposed on the sliding portion 30a. In addition, each of the two ends of the sliding portion 30a is furnished with a pushed portion 31 to receive a trigger portion (not shown) driven to slide the sliding portion 30a. The sliding portion 30a and the stationary portion 30b provide a simple schematic view of the present invention.

Figure 3:
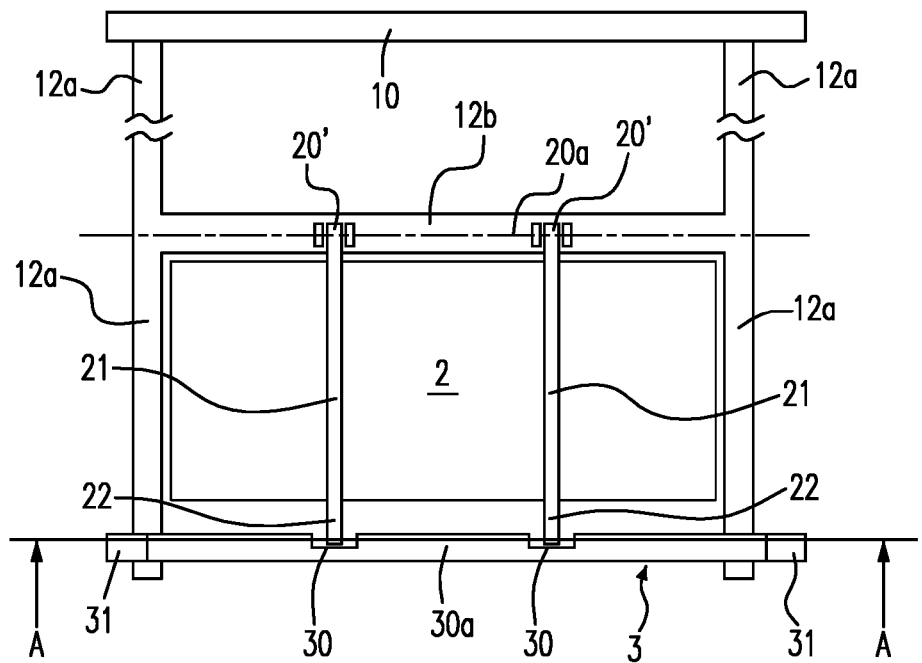
FIG. 3 shows a top view of a blade and a stopper mechanism according to a preferred embodiment of the present invention.
Figure 5:
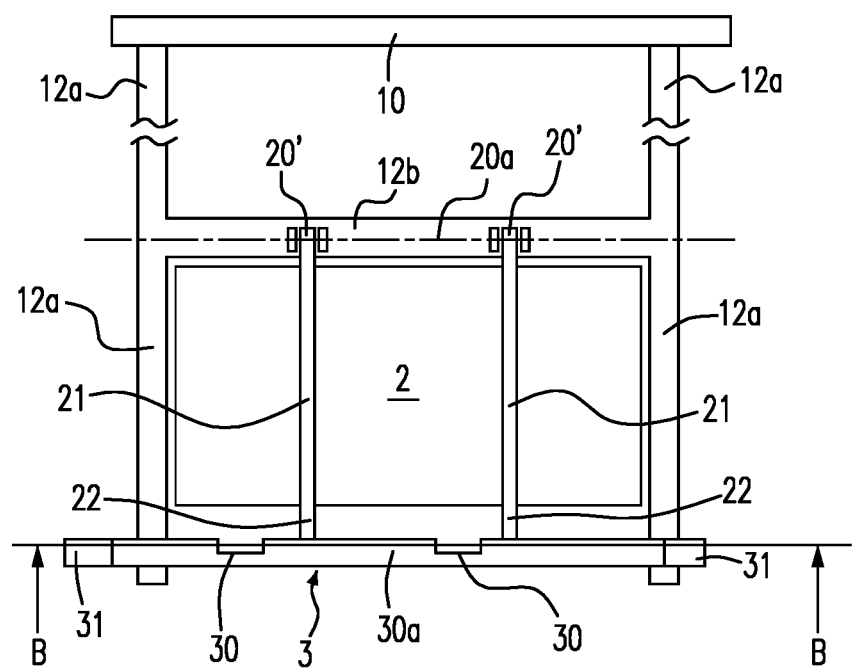
FIG. 5 shows a top view of a blade and a stopper mechanism according to a preferred embodiment of the present invention.

Please refer to FIG. 3 and FIG. 5, which are plan view diagrams of the blade and stopper mechanism according to the present invention. In FIG. 3, the sliding portion 30a is located at the open position of the stopper mechanism 3. In FIG. 5, the sliding portion 30a 3 is located at the stop position of the stopper mechanism. A push portion 31 is furnished at each end of the sliding portion 30a. Please continue to refer to FIGS. 3 and 5, wherein the blade frame 12 (refer to FIGS. 1 and 2) is composed of radial arms 12a and a crossbar 12b. A pivoting portion 20' is pivotally disposed on the cross bar 12b, i.e., the blade 2 is rotatably disposed in the blade frame 12 through the pivoting portion 20'. The radial arms 12a radially extend out from the turbine shaft 10 (referring to FIGS. 1 and 2), while the crossbar 12b connects two radial arms 12a at its both ends. The blade 2 is pivotally connected to the crossbar 12b via a connecting arm 21. Furthermore, a blade pivot shaft 20 is disposed in the pivoting portion 20' (see FIG. 2), and forms the turbine shaft axial direction 20a which is parallel to turbine shaft 10.

Please continue to refer to FIG. 3 and FIG. 5, which shows the back side of the blade 2, that is, the side opposite to the water-carrying side. In both figures, the blade 2 is moving outwards and off the plane of the drawings due to the force of the water flow. In FIG. 3, the sliding portion 30a is located at the open position, and the gap 30 of the sliding portion 30a is aligned with the stopper 22, which is connected to the connecting arm 21 protruding from the edge of the blade 2. Therefore, when the water flow drives the blades 2, the stopper portion 22 passes the gap 30 without being stopped by the slide portion 30a.

Figure 4:
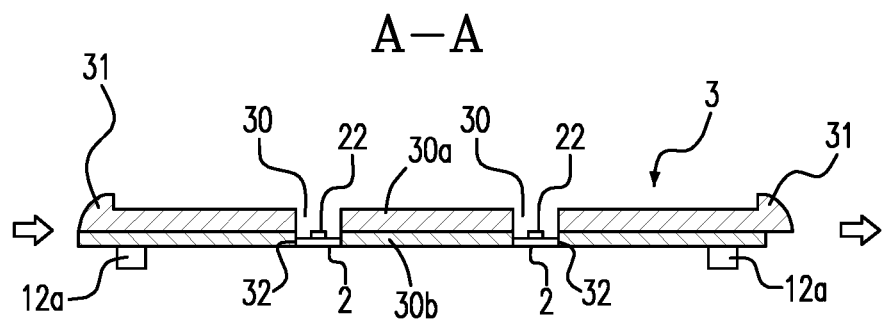
FIG. 4 shows a diagram of A-A cross-section of FIG. 3.

Please also refer to FIG. 4, which is a schematic cross-sectional view AA of FIG. 3, wherein the stopper mechanism 30b of the stationary portion 3 is located in the blade frame 12 (referring to FIGS. 1 and 2) on the radial arms 12a, while the sliding portion 30a is located on the stationary portion 30b. A push portion 31 is furnished at each end of the sliding portion 30a, which can slide to the right when the pushed portion 31 at the left end is pushed to the right.

Stationary section 30b further has an accommodating portion 32 to accommodate the stopper 22. In FIG. 4, it is clear that the gap 30 faces the stopper 22, so when the water flows upward to drive the blade 2 (see FIG. 3), the stopper 22 passes through the gap 30.

In FIG. 5, the sliding portion 30a is located at the position of the stopper 22, and the gap 30 of the sliding portion 30a deviates from the stopper portion 22, i.e., is not aligned with the stopper portion 22. When the blade 2 thus driven by the flow of water, the stopper 22 will be blocked by the sliding portion 30a and can not pass the gap 30. In other words, in the case where the stopper portion 22 abutting with the sliding portion 30a, wafer flow drives the blade 2 while the stopper 22 is biased toward the slide portion 30a, and then the water flow indirectly pushes the blade frame 12 through the static section 30b and causes the water turbine to rotate.

Figure 6:
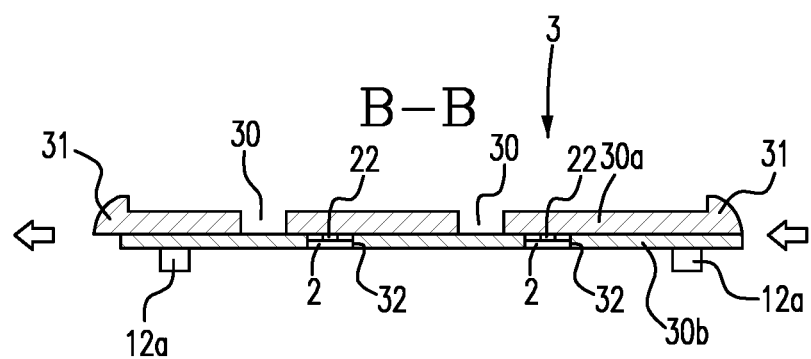
FIG. 6 shows a diagram of B-B cross-section of FIG. 5.

Please refer to FIG. 6, which is a schematic cross-sectional view BB of FIG. 5, wherein the stationary portion 30b of the stopper mechanism 3 is disposed on the radial arms 12a of the blade frame 12, and the sliding portion 30a is located on a stationary unit 30b. A push portion 31 is furnished on each end of the sliding portion 30a, allowing the sliding portion 30a to slide to the left when the pushed portion 31 is pushed to the right. The stationary portion 30b further includes an accommodating portion 32 for accommodating the stopper portion 22. It can be seen in FIG. 6 that the gap 30 does not correspond to the stopper portion 22, i.e., both are staggered, so when the water flows upwards to drive the blade 2 (see FIG. 5), the stopper 22 is stopped by the sliding portion 30a and the stopper 22 can not pass the gap 30.

Figure 7:
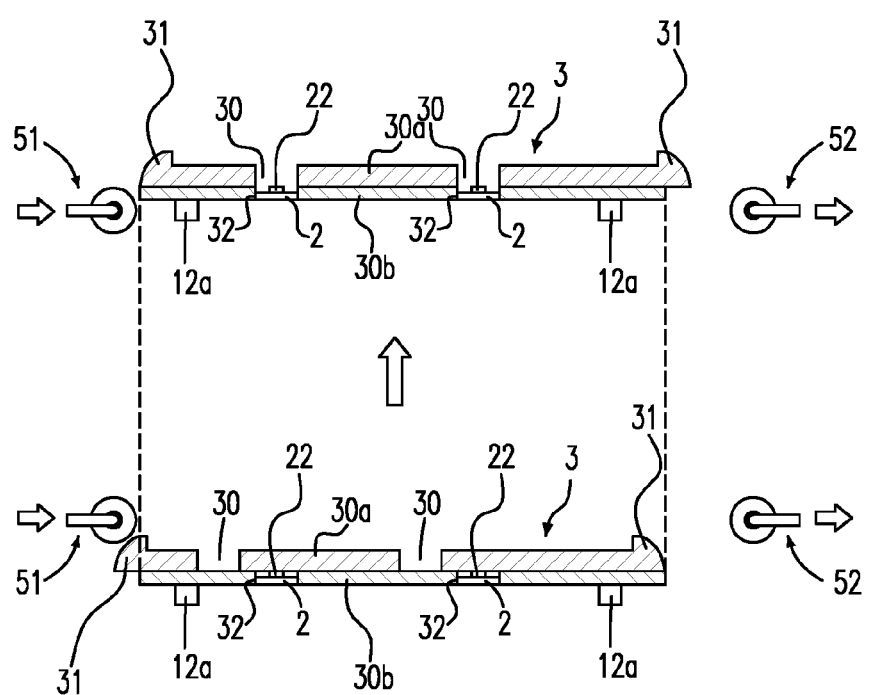
FIG. 7 shows a diagram where a stopper mechanism changes from a stop condition to an open condition.

Please refer to FIG. 7, which is a schematic diagram showing the stop mechanism from a stopped state to an open state. FIG. 7 is a cross-sectional view in accordance with the direction AA of FIG. 4, and is also a sectional in accordance with the direction BB of FIG. 6. The stationary portion 30b of the stopper mechanism 3 is fixed to the blade frame 12 (referring to FIGS. 1 and 2) on the radial arms 12a. First, referring to the lower portion of FIG. 7, when the stopper mechanism 3 is in the stopped state (i.e. abutting, retaining or fixed state), the stopper portion 22 is positioned within the stationary portion 30b of the accommodating portion 32, and the sliding portion 30a is located in the stopped position (i.e. abutting, retaining or fixed position), that is, the stopper 22 is not aligned with the gap 30 and thus the two are staggered. Therefore, when the water flows upward from the bottom to drive blade 2 (referring to FIG. 3), the stopper 22 and the sliding portion 30a abut against each other, that is, the stopper 22 can not pass the gap 30 and is stopped by the sliding portion 30a. The present invention disposes a stopper release mechanism 51 and a stopper actuating mechanism 52 at both sides of a water channel (referring to FIG. 9), usually the right bank and the left bank of a river. For example in FIG. 7, a completed stop cancellation operation is illustrated from the bottom to the top. Starting from the bottom of FIG. 7, the stopper release mechanism 51 is located a trigger position while the stopper actuating mechanism 52 at an initial position (standby position). When the water turbine is driven continuously by the water flow and causes the stopper mechanism 3 rises, the pushing portion 31 on the left, which is a first pushing portion, will contact with the stopper release mechanism 51. The stopper mechanism 3 is moving upward, so the stopper release mechanism 51 provides a downward force which is transferred into a horizontal direction force to push the push portion 31 at the left end of the sliding portion 30a due to an inclined surface on the push portion 31, and then the stopper unit 3 is driven to the right, as shown in the top portion of FIG. 7. The inclined surface of the push portion 31 is preferably a slightly convex arc. The left side of the push portion 31 faces the stopper release mechanism 51 while the right side of the push portion 31 faces the stopper actuating mechanism 52.

According to the illustration in FIG. 7 from bottom to top, it can be understood that the pushed portion 31 on the left come into contact with the stopper release mechanism 51 so that the sliding portion 31a is pushed to the right and slides to the open position (release position), and then the gap 30 is aligned with stopper 22 to cause the stopper device 3 in the open state (released state). When the blade frame 12 continues to rotate until the water once again in contact, since the gap 30 is aligned with the stopper 22 so that the sliding portion 31a can not stop the swinging of the blade 2, and thus the blades 2 will incline around the blade frame 20 as the center of rotation due to the push from the water-flow (referring to FIG. 10). In addition, because the stopper actuating mechanism 52 is at the initial start position and will not contact the push portion 31 at the right end of the stopper mechanism 3, there will be no interference phenomenon therein between. Furthermore, in order to allow the stopper release mechanism 51 to smoothly contact with the push portion 31, the stopper release mechanism 51 can be designed as a roller so as to be pushed without excessive friction.

Figure 8:
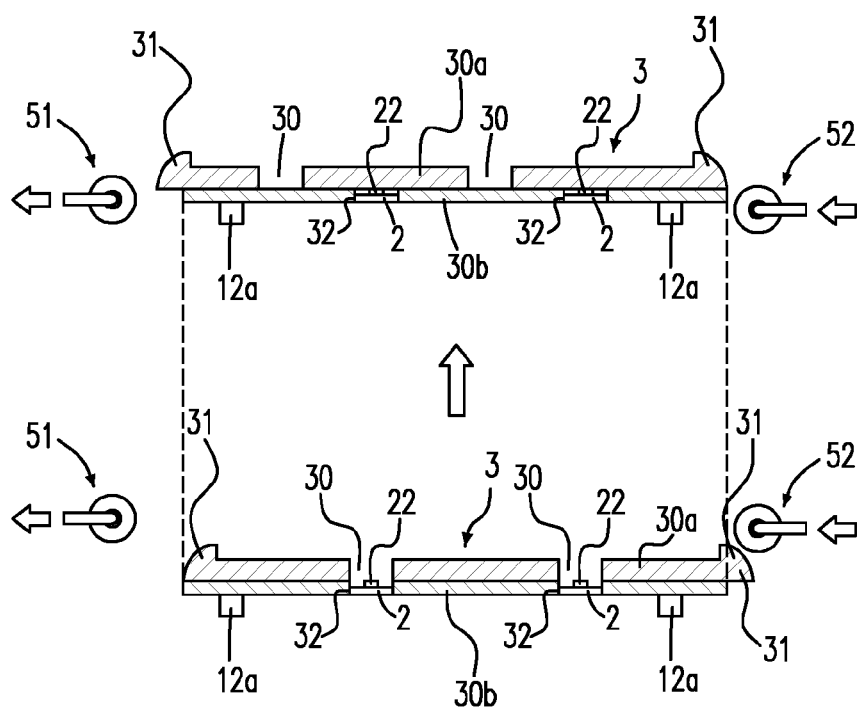
FIG. 8 shows a diagram where a stopper mechanism changes from an open condition to a stop condition.

Please refer to FIG. 8, which is a schematic diagram showing the stop mechanism from an open state to a stop state. FIG. 8 is a cross-sectional view in accordance with the direction AA of FIG. 4, and is also a sectional in accordance with the direction BB of FIG. 6. The stationary portion 30b of the stopper mechanism 3 is fixed to the blade frame 12 (referring to FIGS. 1 and 2) on the radial arms 12a. First, referring to the lower portion of FIG. 8, when the stopper mechanism 3 is in the open state, the stopper portion 22 is positioned within the stationary portion 30b of the accommodating portion 32, and the sliding portion 30a is located in the stopping position, that is, the stopper 22 is align with the gap 30. Therefore, when the water flows upward from the bottom to drive blade 2 (referring to FIG. 3), the stopper 22 will not be stopped by the sliding portion 30a. The present invention disposes a stopper release mechanism 51 and a stopper actuating mechanism 52 at both sides of a water channel (referring the water channel 4 and the bank 41 in FIG. 9), usually the right bank and the left bank of a river. For example in FIG. 8, a completed stop operation is illustrated from the bottom to the top. Starting from the bottom of FIG. 8, the stopper release mechanism 51 is located an initial position (standby position) while the stopper actuating mechanism 52 at a trigger position. When the water turbine is driven continuously by the water flow and causes the stopper mechanism 3 rises, the pushing portion 31 on the right, which is a second pushing portion, will contact with the stopper actuating mechanism 52. The stopper mechanism 3 is moving upward, so the stopper actuating mechanism 52 provides a downward force which is transferred into a horizontal direction force to push the push portion 31 on the right end of the sliding portion 30a due to an inclined surface on the push portion 31, and then the stopper unit 3 is driven to the left, as shown in the top portion of FIG. 8.

According to the illustration of FIG. 8 from bottom to the top, it can be understood that the pushed portion 31 on the right come into contact with the stopper actuating mechanism 52 so that the sliding portion 31a is pushed to the left and slides to the stopping position (abutting, retaining or fixed position), and then the gap 30 is no longer aligned with stopper 22 and thus the two are staggered. When the blade frame 12 continues to rotate until the water once again in contact, since the gap 30 is not aligned with the stopper 22 so that the sliding portion 31a can stop the swinging of the blade 2, and thus the blades 2 will not rotate around the blade frame 20 when pushed by the water-flow (referring to FIG. 2). In addition, since the stopper release mechanism 51 is at the initial start position and will not contact with the push portion 31 at the left end of the stopper mechanism 3, and therefore there will be no interference phenomenon therein between. Based on FIGS. 7 and 8, it is understood that the stopper release mechanism 51 and the stopper actuating mechanism 52 have the efficacy of triggering an operation. Furthermore, in order to allow the stopper actuating mechanism 52 can smoothly contact with the push portion 31, the stopper actuating mechanism 52 can be designed as a roller so as to be pushed without excessive friction.

Figure 9:
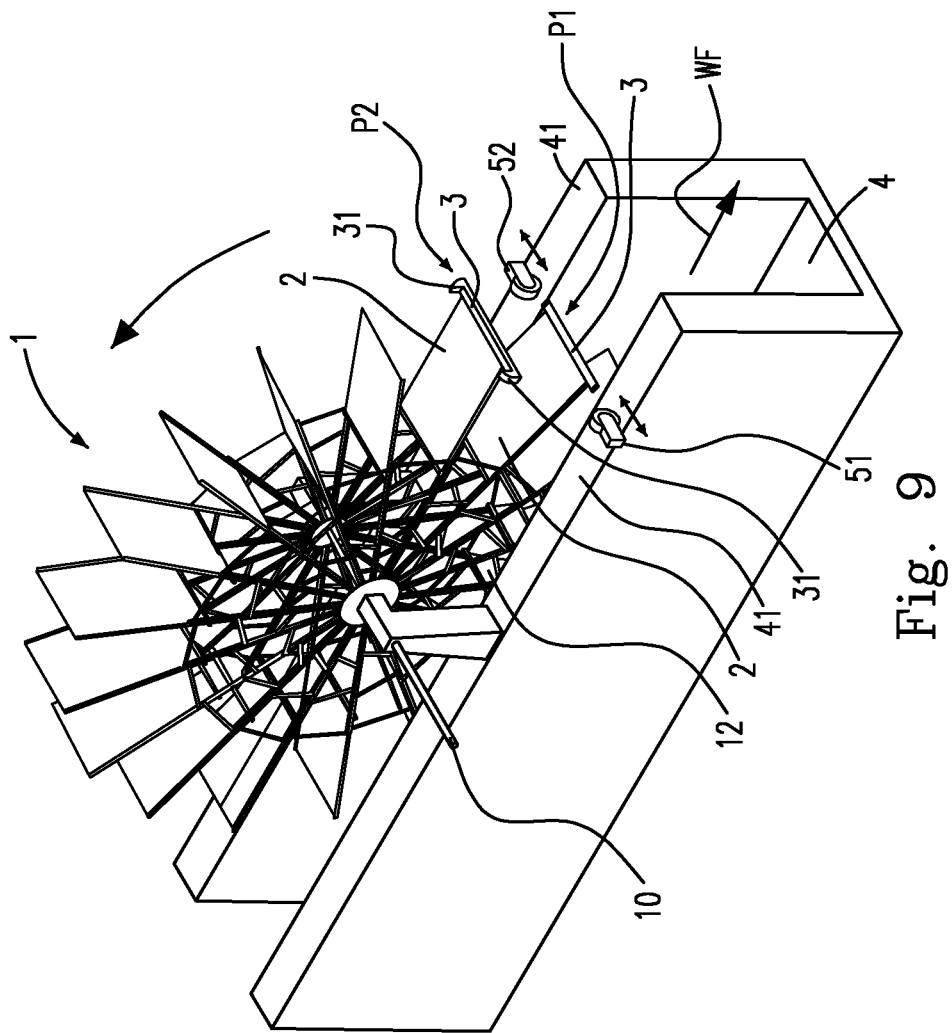
FIG. 9 shows an overall diagram of a water turbine device according to the present invention.

FIG. 9 illustrates the overall schematic drawing of a water turbine device of the present invention. Wherein a water turbine 1 (also called a waterwheel) acts as a whole, and therefore it has a plurality of blade frames each of the blade frames 12 is configured surround a water shaft 10 and the water turbine 1 is set in a water channel 4, i.e. a bank of the water channel 4 by means of the water shaft 10. A water flow WF is substantially flowing from the upper-left to lower-right in the drawing. Thus as seen from the left of the water turbine 1, the water turbine 1 rotates in a counter-clockwise direction. A position of the blade 2 at about three o'clock is a location above the water, which is the downstream side of the water channel 4, and a position of the blade 2 at nine o'clock is a position falling into the water, which is the upstream side of the water channel 4. A stopper release device 51 and a stopper actuating device 52 are both located on the bank 41 near a location away from the water that moves the blade 2. Certainly, it can also be located at the position enters the water. However for the ease of illustration, the present invention only describes the condition of the stopper release device 51 and the stopper actuating device 52, where both are configured in positions away from the water. With disclosures in the present invention, a skilled person in the art can easily understand that these two devices may be configured in the position enters the water. FIG. 9 shows that there is an individual blade 2 paired with a stopper device 3 near the top and near the bottom of the stopper release device 51 and the stopper actuating device 52 respectively. Thus it can be understood how the turbine control system in the present invention works as shown in FIGS. 3-8. The stopper device 3 and blades 2 in FIG. 9 are illustrated as simple drawings. For the detailed structure, please refer to FIGS. 1-3 and 5.

Please continue to refer to FIG. 9, wherein the blade 2 beneath the stopper release device 51 is above the water and the stopper actuating device 52 is at a position P1 before a trigger, and the blade 2 above them is at a position P2 after the trigger. Therefore, as shown in with FIGS. 7-8, the position P1 before the trigger is illustrated at the bottom of these two drawings, and the position P2 after the trigger is illustrated in the upper part of these two drawings. Thus as shown in FIGS. 7-8 and the relevant descriptions, and viewing FIGS. 7-8 together, the stopper device 3 at the position P1 before the trigger is configured at a stop position, as in the bottom part of FIG. 7. When the water turbine 1 continues to rotate counterclockwise, it means that the stopper device 3 in FIG. 7 has a bottom-up movement. As a push portion at the left side of the stopper device 3 is triggered by the stopper release device 51, a sliding portion 30a of the stopper device 3 will slide to the right and as shown in the upper part of FIG. 7, and at this time the position of the stopper device 3 is in the position P2 after the trigger in FIG. 9. Similarly, viewing FIGS. 8-9 together, the stopper device 3 at position P1 before the trigger is configured in an open position, as in the bottom part of FIG. 8. When the water turbine 1 continues to rotate counterclockwise, the stopper device 3 in FIG. 8 has a bottom-up movement. As a push portion at the right side of the stopper device 3 is triggered by the stopper release device 52, a sliding portion 30a of the stopper device 3 will slide to the left as shown in the upper part of FIG. 8, and at this time the position of the stopper device 3 is position P2 after the trigger in FIG. 9. For the remaining description, please refer to FIGS. 7-8 and the relevant text, there is no need to repeat them here.

Figure 10:
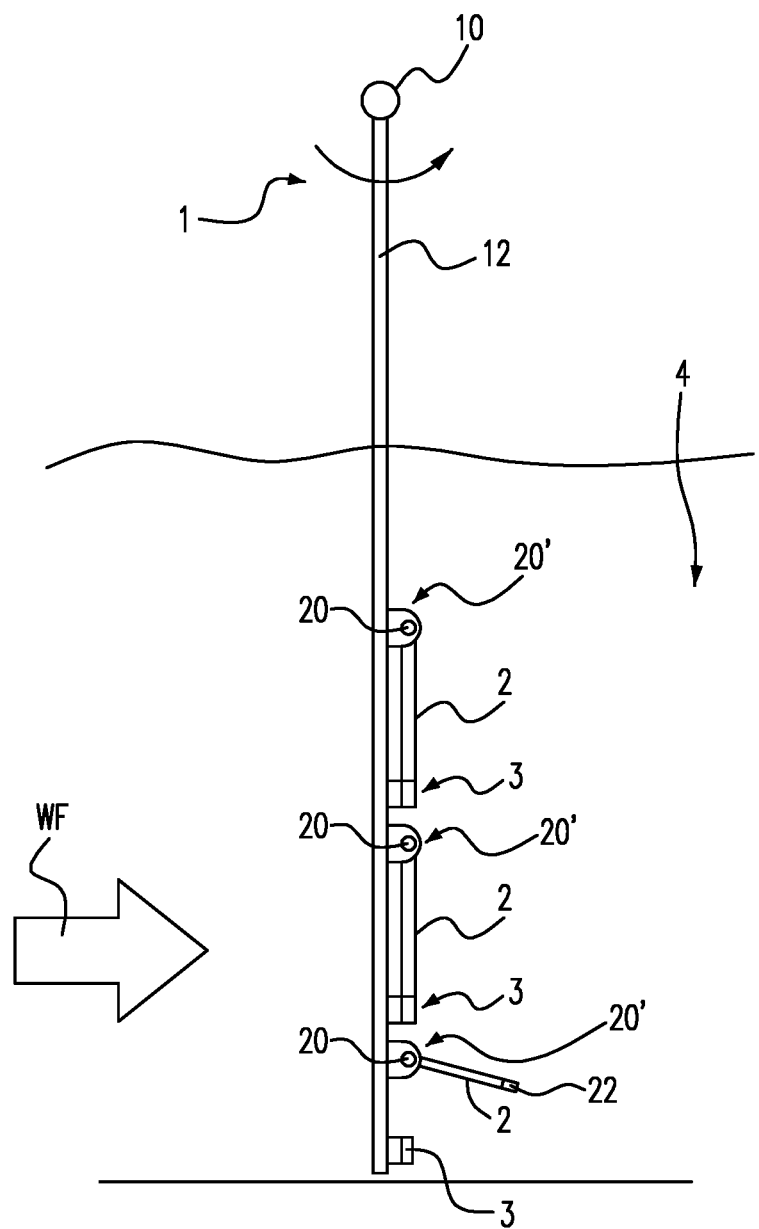
FIG. 10 shows a diagram of a blade in water flow after the stopper mechanism is released according to the present invention.

Please refer to FIG. 10, which illustrates the status of the blade in the water flow after the stopper is released in the present invention. For the simplicity of drawings, only one of the blade frames 12 of the water turbine 1 is shown. A blade frame 12 extends from the water shaft 10, and three blades 2 are configured in the radial of the water shaft 10, each of the blades 2 is pivotally connected to the blade frame 12 via the pivot shaft 20, and rotates around the water shaft 10. As FIG. 10 is shows, it rotates counterclockwise and a water flow WF in a water channel 4 flows from left to right. Because the stopper mechanism 3 of the bottom blade 2 is already in the free state the notch 30 of the stopper mechanism 3 is aligned with the stopper 22 and therefore does not stop the stopper 22. Thus by the force of the water flow WF, the blade 2 will turn around the axis of pivot shaft 20. That is to say, the bottom blade 2, free from the stopper receives a relatively smaller push force because part of the force has been converted into an upward force exerted on the blade 2. That is to say, the force of the water flow WF is converted to the power to rotate the blade 2 itself. Thus for the blade frame 12, there are only two remaining blades 2 within the water flow WF, so this reduces the force to rotate the water turbine 1 (please refer to FIG. 9). Because the stopper mechanisms 3 of the upper and the middle blades 2 are still in the stopped position, and the notch 30 of the stopper mechanism 3 and the stopper 22 abut each other, the stopper mechanism 3 stops the stopper 22. Thus by the force of the water flow WF, the blade 2 will not turn around the axis of pivot shaft 20. That is to say, the upper and the middle blades 2 caused the stopper to receive relatively larger push forces, because none of the forces have been dispersed to be the force for these two blades 2 pivoting themselves. That is to say, the force of the water flow WF could not rotate these two blades 2 themselves. There are only two remaining blades 2 within the water flow WF, so this reduces the force that rotates the water turbine 1 (please refer to FIG. 9).

Please continue to refer to FIGS. 1 and 10, one of the features of the present invention is that the axis of the pivot shaft 20 and that of the water shaft 10 are parallel. Therefore, the turning direction and the tangential direction for the rotating turbine are identical. That is, the rotation plane of the water shaft 10 and the rotation plane of the blade 10 are parallel and overlap each other. In other words, when the blade 2 is not staged, the water flow impacting the blade 2 to lead it to tilt, and the tilted blade 2 will produce a component force due to the force of the water flow WF exerted on the blade 2. In addition, because the axis of the pivot shaft 20 and that of the water shaft 10 are parallel, the component generated by the unfixed blades 2 is only exerted on the rotation plane of the water shaft 10. That is, this component passing from the blade frame 12 will only allow the water shaft 10 to rotate according to its own axis instead of rotating on another axis. In other axial forces are exerted on the water shaft 10, it would cause the water shaft 10 and the axis to bear uneven forces, shortening the life of the water shaft 10. As it is not designed to receive a variety of axial rotation or urging, while it only rotates around its own axis. So the arrangement of the pivot shaft 20 and the water shaft 10 in parallel could avoid the component of the blade 2 exerted on the water shaft 10 in the other direction. Therefore, the design of the present invention does not endanger the long-term stability of the water shaft 10.

Figure 11:
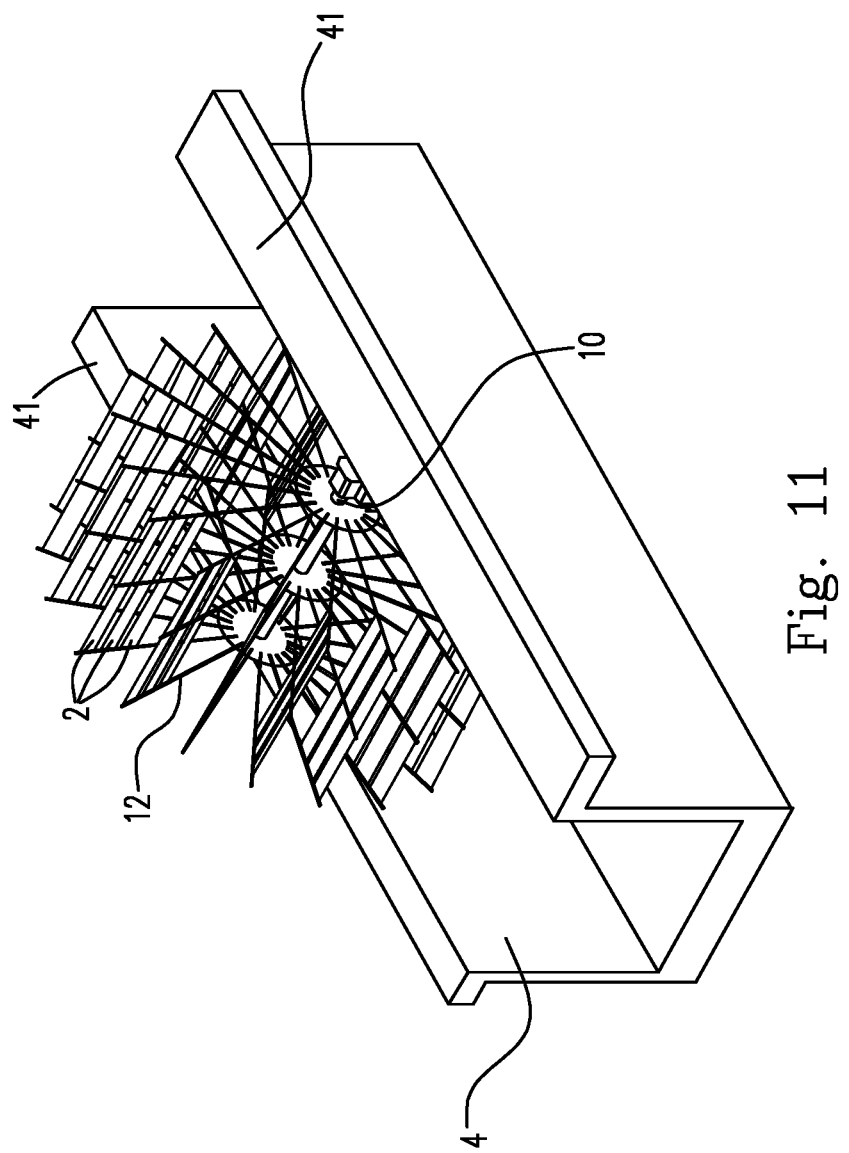
FIG. 11 shows an overall diagram of a water turbine device with a plurality of blades according to the present invention.

Please refer to FIG. 11, which illustrates the overall schematic drawing of a water turbine device with plural blades as disclosed in the present invention. As shown, plural blade frames 12 are configured around a water shaft 10, on which each blade frame 12 has three blades 2. In FIG. 11, two blade frames 12 are configured side by side at the same location on the water shaft 10. Therefore, there are six blades at the same location in total. For the simplicity of drawing, only two banks 41, a water shaft 10, a water channel 4, an individual blade frame 12 and blade 2 are drawn. However, for the detail of each individual blade 2 and each blade control mechanism 3 (stopper mechanism), please refer to FIGS. 2 to 6 and the relevant description. For the interaction among the blade control mechanism 3, the stopper release device 51 and the stopper actuating device 52, please refer to FIGS. 7 to 9 and the relevant description. FIG. 9 shows a blade 2 configured along a radial of the water shaft 10 of the blade frame 12, while FIG. 11 shows three blades 2 configured along a radial of the water shaft 10 of the blade frame 12. Therefore there are three stopper release devices 51 and three stopper actuating devices 52 in FIG. 11 (please see FIG. 9). The arrangement direction matches the location of the three blades 2, and three stopper release device 51 and three stopper actuating devices 52 are configured along the water shaft 10 on the bank.

Figure 12:
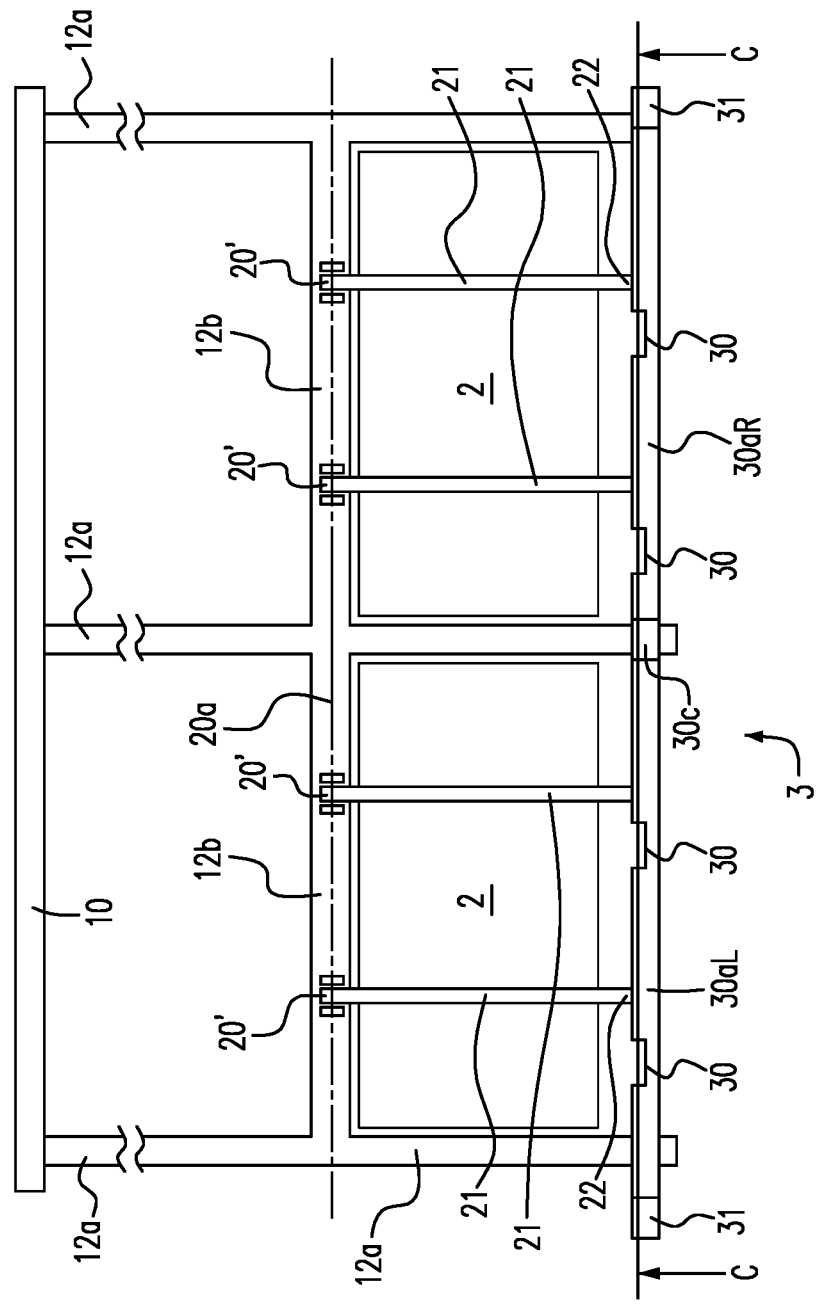
FIG. 12 shows a top view of a stopper mechanism of a water turbine device with a plurality of blades according to the present invention.

Please refer to FIG. 12, which is a plan view of a stopper mechanism of a turbine with plural blades in the present invention. It is also a plan view of the local structure of FIG. 11, but it only shows a set of adjacent blades, configured in parallel to the direction of water shaft 10. In FIG. 12, two blades are configured as the left and right sides. It can also be understood that the two blades 2 disclosed in FIG. 5 are arranged side by side. And therefore in the same lateral position, stopping and releasing the two blades 2 can be linked. As substantially shown in FIG. 5, sliding portions (30aL, 30aR, 30c) of a stopper mechanism 3 in FIG. 12 are configured at the stop positions. However, the difference is that the sliding portion in FIG. 12 can be divided into three parts, the left blade 2 coupling with a left sliding portion 30aL, the right blade coupling with a right sliding portion 30aR and a transition portion 30c between two sliding portions (30aL, 30aR). This is used to pass the impact force exerted on the left and right sliding portions from the stopper release device 51 (see FIG. 7) and the stopper actuating device 52 (see FIG. 9), from one of the sliding portions to the other. The left sliding portion 30aL is positioned to move the stopper 22 of the left blade 2, and the right sliding portions 30aR is positioned to move the stopper 22 of the right blade 2. The other structure is almost the same as shown in FIG. 5. A push portion 31 on the left side of the left sliding portion 30aL receives the impact from the stopper release mechanism 51 (please refer to FIG. 7), and a push portion 31 on the right side of the right sliding portion 30aL receives the impact from the stopper actuating mechanism 52 (please refer to FIG. 8). Furthermore, a blade frame 12 can be further divided into a radial arm 12a and a crossbar 12b. A radial arm 12a extends radially from the water shaft 10, and a crossbar 12b connects with three radial arms 12a. A blade 2 is connected to the cross bar 12b via pivoting portion 20', comprising a pivot shaft 20 (please refer to FIG. 2) and thereby forms a rotating axis 20a parallel to the water shaft 10 (please refer to FIG. 11). There is also a connecting arm 21 in FIG. 12, and the blade 2 is configured on the connecting arm 21. One end of the connecting arm 21 is a pivoted end, the other end is a stopper end, and the pivoted end serves as the pivoting portion 20', and is pivotally connected to the blade frame 12 via the pivot shaft 20. The stopper end forms a stopper 22 protruding outside the edge of the blade 2, and because the stopper 22 and a gap portion 33 of the stopper mechanism 3 are staggered, the stopper 22 and a gap portion 33 abut each other to generate the stopping effect.

Figure 13:
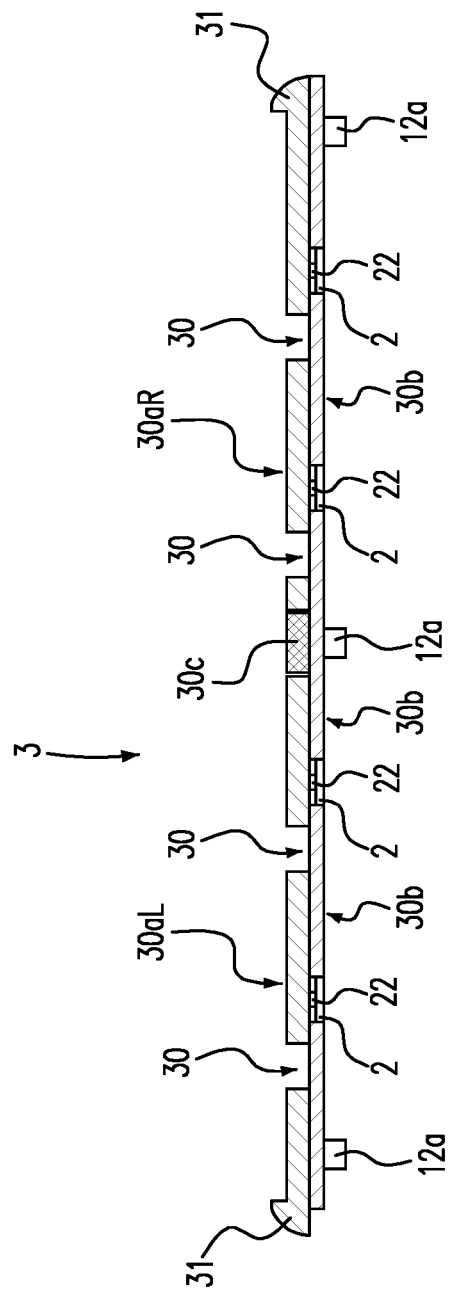
FIG. 13 shows a diagram of C-C cross-section of FIG. 12.

Please refer to FIG. 13, which is a schematic view in a C-C profile of FIG. 12. FIG. 13 also illustrates a cross-sectional view of the local structure of FIG. 11, but it only shows the stopper mechanism 3 associated with the adjacent blades 2 side by side. A sliding portion of FIG. 13 is shown in FIG. 12, and it can be divided into three parts, the left blade paired with a left sliding portion 30aL, the right blade paired with a right sliding portion 30aR and a transition portion 30c between two sliding portions (30aL, 30aR). This is used to pass the impact force exerted on the left and right sliding portions from the stopper release device 51 (see FIG. 7) and the stopper actuating device 52 (see FIG. 9), from one of the sliding portions to the other. All of the sliding portions (30aL, 30aR) and the transition portion 30c slide on the stationary portions 30b. The stationary portions 30b are fixed on three radial arms 12a, which are not only capable of guiding the sliding movement for each slide portion and the transition portion, but they also maintain the distance among the three radial arms 12a. The left sliding portion 30aL is positioned to move with the stopper 22 of the left blade 2, and the right sliding portion 30aR is positioned to move the stopper 22 of the right blade 2. That is, each stopper 22 is staggered with a notch 33. Please refer to FIGS. 4, 6 and 7-8. For the function of the push portion 31, there is no need to repeat them here. The sliding portions (30aL, 30aR), a transition portion 30c and a stationary portion 30b in FIGS. 12-13 are illustrated as simple drawings. The skilled person in the art of mechanical engineering can easily understand the detailed structures of the sliding portions (30aL, 30aR), the transition portion 30c and the stationary portion 30b in the present invention based on the sliding mechanism.

Therefore, it can be deduced from FIGS. 12-13 that when three blades are configured side by side, each blade is equipped with a sliding portion, and therefore a transition portion lies between each of the two adjacent sliding portions. So in terms of an embodiment with three blades configured side by side, a stopper mechanism in the same horizontal row is equipped with two transition portions. Thus, whenever N blades are configured side by side, there are N−1 transition portions in the corresponding stopper mechanisms. Also in the embodiment with three blades configured side by side, the two ends of the sliding portions associated with the blade in the middle position do not need a push portion. However, two ends of the sliding portions in this position are associated with a transition portion, i.e. a left transition portion is associated with a left transition portion, while a right transition portion is associated with a right transition portion. For example, when the push portion of the left sliding portion is triggered, its laterally moving force passes to the center sliding portion through the left transition portion, and then it passes to the right sliding portion through the right transition portion. Similarly, in an embodiment with plural blades configured side by side, only the left most and the right most sliding portion are necessary to have pushing portions, while other pushing portions are not needed.

In summary, the present invention "Water wheel device and control mechanism therefor" switches between a rotatable status and a non-self-rotatable status for the turbine blades. Furthermore, a self-rotatable axis is parallel to a rotation axis of a turbine, so that when the blades themselves rotate and tilt, this can not only reduce the impact of the water flow on the turbine, but also the components generated from the water flow pushing on the blades will not cause the rotation axis to tilt. This invention can be used in both generators and mills. Thus, by means of the present invention, namely using a self-swingable blade to release a stopper blocking the blades when the water flow surges, part of the water flow is converted into a force pushing the blades to tilt in order to disperse part of the power. While the other part of the water flows therefore further reduce the impact on the turbine through the original position of the blades. That is, as the impact of the water flow is dispersed, the overall impact on the turbine is reduced, and any chance to destroy the turbine is also greatly reduced. The skilled person in the art can appreciate that the probability of a generator and or a mill being damaged because of a large rotation force is also reduced. In addition, the overall reliability of the turbine is improved, the maintenance interval for the turbine can be lengthened, and thereby the maintenance cost is reduced. Furthermore, the present invention can control the water velocity and the water flow passing through the gate of the water channel, and therefore there is no interference towards needs for water in the downstream, and it will not increase the siltation, nor cause water before the gate getting rise due to the gate setting off. Thus the present invention makes immense new contributions to turbine technology.

Embodiments

1. A water turbine device includes a water shaft, a plurality of blade frames, a plurality of turbine blades, a pivot shaft and a blade control mechanism. The water shaft has a first axis. The plurality of blade frames are radially distributed around the water shaft. The plurality of turbine blades are mounted on the plurality of blade frames respectively. The pivot shaft is disposed on a corresponding one of the plurality of blade frames, has a second axis, and allows one of the plurality of turbine blades corresponding to the corresponding blade frame to be pivotally mounted on the corresponding blade frame. The blade control mechanism is disposed on an end opposite to the pivot shaft on the corresponding blade frame, wherein the turbine blade mounted on the corresponding blade frame has a stopper adjacent to the blade control mechanism.

2. In the water turbine device according to Embodiment 1, the first axis and the second axis are parallel to each other.

3. In the water turbine device according to Embodiments 1-2, the stopper protrudes from the turbine blade.

4. In the water turbine device according to Embodiments 1-3, the blade control mechanism includes a gap portion, so that when the blade control mechanism is moved to allow the gap portion to align with the stopper, the stopper can freely pass through the blade control mechanism.

5. In the water turbine device according to Embodiments 1-4, the water turbine device further includes a stopper release mechanism and a stopper actuating mechanism. The stopper release mechanism is adjacent to the blade control mechanism, wherein the stopper release mechanism contacts and causes the blade control mechanism to no longer abut against the turbine blade. The stopper actuating mechanism is adjacent to the blade control mechanism, wherein the stopper actuating mechanism contacts and causes the blade control mechanism to abut against the turbine blade.

6. In the water turbine device according to Embodiments 1-5, the stopper release mechanism and the stopper actuating mechanism are rollers.

7. In the water turbine device according to Embodiments 1-6, the water shaft is disposed in a water channel, and the stopper release mechanism and the stopper actuating mechanism are disposed beside the water channel.

8. A control mechanism for controlling a water turbine device, wherein the water turbine device includes a water shaft, a plurality of blade frames radially distributed around the water shaft, a plurality of turbine blades mounted on the plurality of blade frames respectively, and a pivot shaft disposed on a corresponding one of the plurality of blade frames to allow one of the plurality of turbine blades corresponding to the corresponding blade frame to be pivotally mounted on the corresponding blade frame. The control mechanism includes a stopper and a control element. The stopper is disposed on the turbine blade mounted on the corresponding blade frame and mounted thereon the pivot shaft. Under a first condition, the control element abuts against the stopper to restrain a pivot turn of the turbine blade, and under a second condition, the control element releases an abutment with the stopper to allow the turbine blade to pivot relative to the corresponding blade frame.

9. In the control mechanism according to Embodiment 8, the stopper is a free end of the turbine blade.

10. In the control mechanism according to Embodiments 8-9, the stopper protrudes from the turbine blade.

11. In the control mechanism according to Embodiments 8-10, the control element includes a gap portion, so that when the control element is moved to allow the gap portion to align with the stopper, the stopper can freely pass through the control element.

12. In the control mechanism according to Embodiments 8-11, the control mechanism further includes a first push portion and a second push portion. The first push portion is disposed at one end of the control element, wherein when the first push portion is pushed, the control element changes from the first condition to the second condition, and thereby releases the abutment with the stopper. The second push portion is disposed at the other end of the control element and opposite to the first push portion, wherein when the second push portion is pushed, the control element changes from the second condition to the first condition, and restores the abutment with the stopper to restrain the pivot turn of the turbine blade.

13. In the control mechanism according to Embodiments 8-12, the first push portion and the second push portion have a camber shape.

14. In the control mechanism according to Embodiments 8-13, the water turbine device is configured in a water channel.

15. In the control mechanism according to Embodiments 8-14, the control element further includes a stopper release mechanism disposed in the water channel and adjacent to the first push portion, wherein the stopper release mechanism is used to contact and push the first push portion.

16. In the control mechanism according to Embodiment 8-15, the control element further includes a stopper actuating mechanism disposed in the water channel and adjacent to the second push portion, wherein the stopper actuating mechanism is used to contact and push the second push portion.

17. In the control mechanism according to Embodiments 8-16, the stopper release mechanism and the stopper actuating mechanism are rollers.

18. In the control mechanism according to Embodiments 8-17, the control element further includes a transition portion disposed between the first push portion and the second push portion.

Based on the above, the present invention effectively solves the problems and drawbacks in the prior art, and thus it meets the demands of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A water turbine device, comprising:
a water shaft having a first axis;
a plurality of blade frames radially distributed around the water shaft;
a plurality of turbine blades mounted on the plurality of blade frames respectively;
a pivot shaft disposed on a corresponding one of the plurality of blade frames, having a second axis, and allowing one of the plurality of turbine blades corresponding to the corresponding blade frame to be pivotally mounted on the corresponding blade frame; and
an axially extending body disposed on an end opposite to the pivot shaft on the corresponding blade frame, wherein the turbine blade mounted on the corresponding blade frame has a stopper adjacent to the axially extending body, and the first axis and the second axis are parallel to each other.

2. The water turbine device as claimed in claim 1, wherein the stopper protrudes from the turbine blade.

3. The water turbine device as claimed in claim 2, wherein the axially extending body includes a gap portion, so that when the axially extending body moves to allow the gap portion to align with the stopper, the stopper can freely pass through the axially extending body.

4. The water turbine device as claimed in claim 3, further comprising:
a stopper release mechanism being a roller, adjacent to the axially extending body, wherein the stopper release mechanism contacts and causes the axially extending body to no longer abut against the turbine blade; and
a stopper actuating mechanism being a roller, adjacent to the axially extending body, wherein the stopper actuating mechanism contacts and causes the axially extending body to abut against the turbine blade.

5. The water turbine device as claimed in claim 4, wherein the stopper release mechanism and the stopper actuating mechanism are disposed beside the water channel.

6. A control mechanism for controlling a water turbine device, wherein the water turbine device comprises a water shaft having a first axis, a plurality of blade frames radially distributed on the water shaft, a plurality of turbine blades mounted on the plurality of blade frames respectively, and a pivot shaft having a second axis and disposed on a corresponding one of the plurality of blade frames to allow one of the plurality of turbine blades corresponding to the corresponding blade frame to be pivotally mounted on the corresponding blade frame, wherein the first axis and the second axis are parallel to each other, and the control mechanism comprises:
a stopper disposed on the turbine blade mounted on the corresponding blade frame and mounted thereon the pivot shaft; and
an axially extending body, wherein under a first condition, the control element abuts against the stopper to restrain a pivot turn of the turbine blade, and under a second condition, the control element releases an abutment with the stopper to allow the turbine blade to pivot relative to the corresponding blade frame.

7. The control mechanism as claimed in claim 6, wherein the stopper is a free end of the turbine blade.

8. The control mechanism as claimed in claim 7, wherein the stopper protrudes from the turbine blade.

9. The control mechanism as claimed in claim 6, wherein the axially extending body includes a gap portion, so that when the axially extending body moves to allow the gap portion to align with the stopper, the stopper can freely pass through the axially extending body.

10. The control mechanism as claimed in claim 6, further comprising:
a first push portion disposed at one end of the axially extending body, wherein when the first push portion is pushed, the axially extending body changes from the first condition to the second condition, and thereby releases the abutment with the stopper; and
a second push portion disposed at the other end of the axially extending body and opposite to the first push portion, wherein when the second push portion is pushed, the axially extending body changes from the second condition to the first condition, and restores the abutment with the stopper to restrain the pivot turn of the turbine blade.

11. The control mechanism as claimed in claim 10, wherein the first push portion and the second push portion have a camber shape.

12. The control mechanism as claimed in claim 10, wherein the water turbine device is configured in a water channel.

13. The control mechanism as claimed in claim 10, wherein the axially extending body further includes:
a stopper release mechanism being a roller, disposed beside the water channel and adjacent to the first push portion, wherein the stopper release mechanism contacts and pushes the first push portion.

14. The control mechanism as claimed in claim 10, wherein the axially extending body further includes:
a stopper actuating mechanism being a roller, disposed beside the water channel and adjacent to the second push portion, wherein the stopper actuating mechanism contacts and pushes the second push portion.

15. The control mechanism as claimed in claim 10, wherein the axially extending body further includes a transition portion disposed between the first push portion and the second push portion.

* * * * *